A. W. CRAWFORD, DEC'D.
THE TRUSTS AND GUARANTEE COMPANY, LIMITED, ADMINISTRATOR.
CONVEYER.
APPLICATION FILED MAY 27, 1909.

1,004,997.

Patented Oct. 3, 1911.

3 SHEETS—SHEET 1.

Witnesses
Stuart Hilder.
George M. Anderson.

Inventor
A. W. Crawford
By
E. W. Anderson
his Attorney

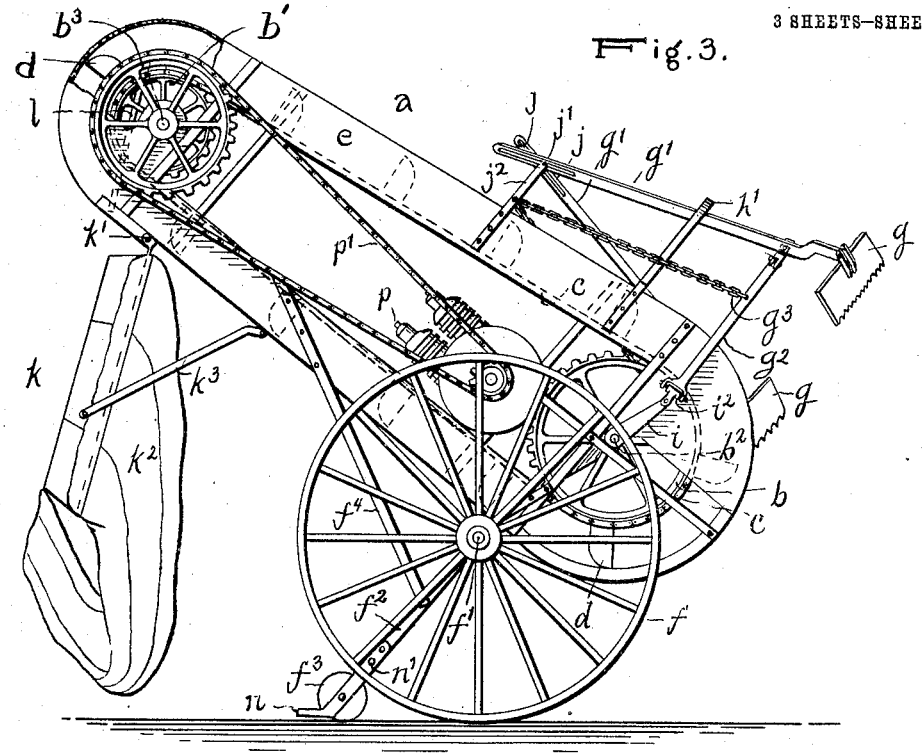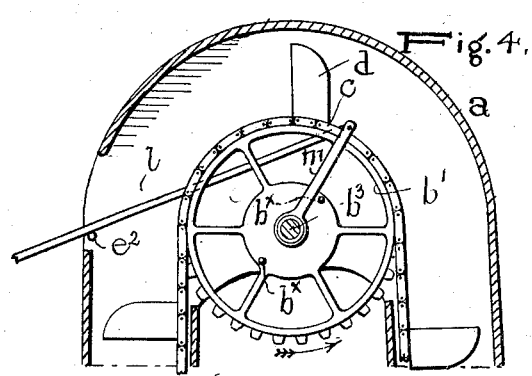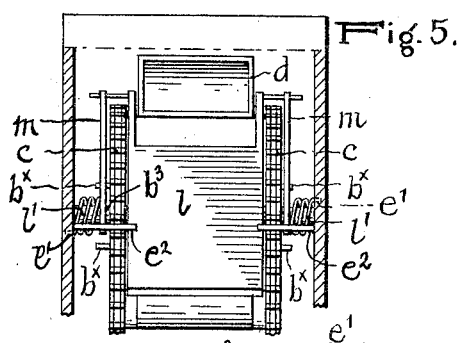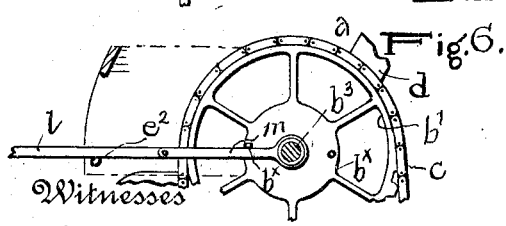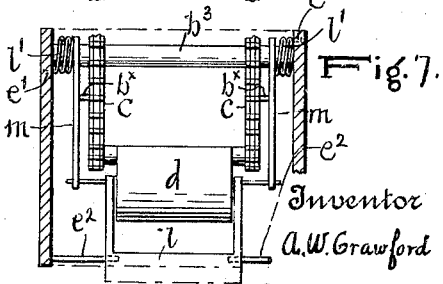

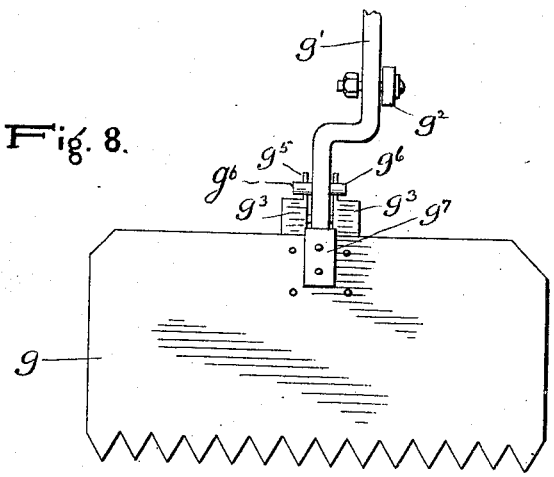
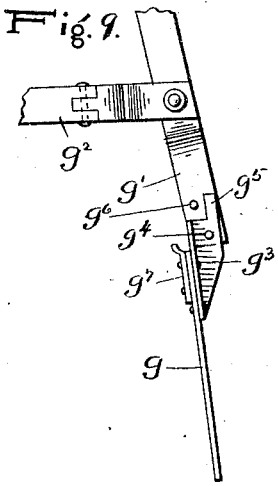
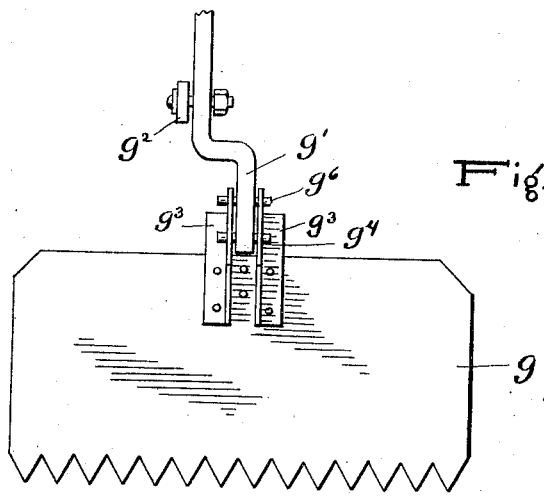

UNITED STATES PATENT OFFICE.

ABNER WALLACE CRAWFORD, OF TORONTO, ONTARIO, CANADA, ASSIGNOR OF ONE-TENTH TO WILLIAM C. PERKINS, OF NIAGARA FALLS, NEW YORK, ONE-TENTH TO FRANK M. WILLIAMS, OF ALBANY, NEW YORK, AND ONE-TENTH TO PHILIP P. PETZ, OF LEWISTON, NEW YORK; THE TRUSTS AND GUARANTEE COMPANY, LIMITED, ADMINISTRATOR OF SAID ABNER WALLACE CRAWFORD, DECEASED.

CONVEYER.

1,004,997.      Specification of Letters Patent.      Patented Oct. 3, 1911.

Application filed May 27, 1909. Serial No. 498,750.

*To all whom it may concern:*

Be it known that I, ABNER WALLACE CRAWFORD, a citizen of the Dominion of Canada, resident of Toronto, in the county of York, Province of Ontario, and Dominion of Canada, have made a certain new and useful Invention in Conveyers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
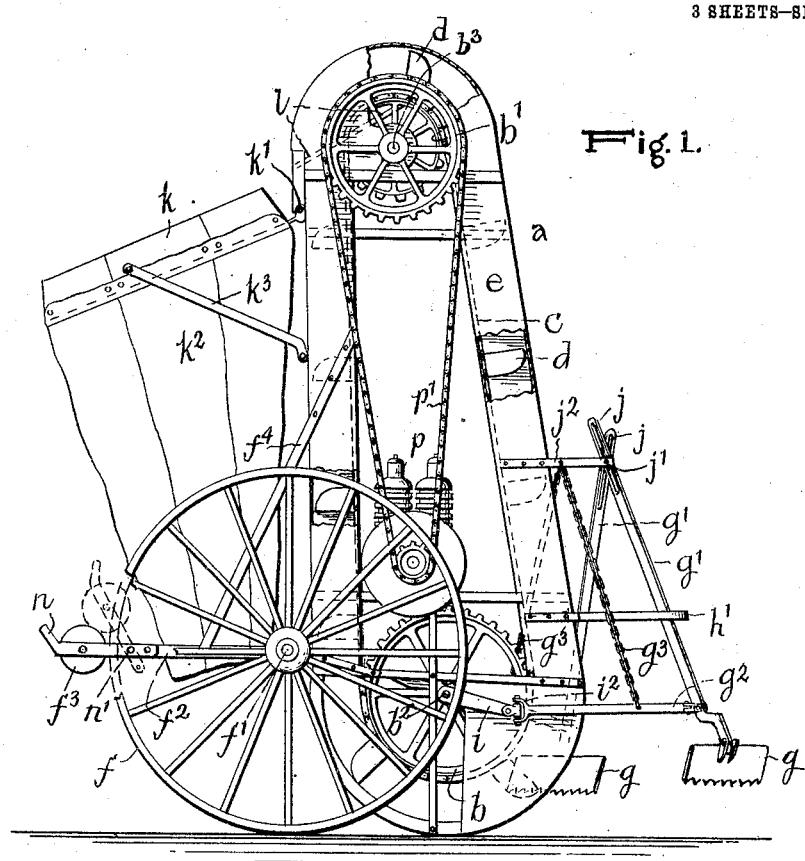
Figure 2:
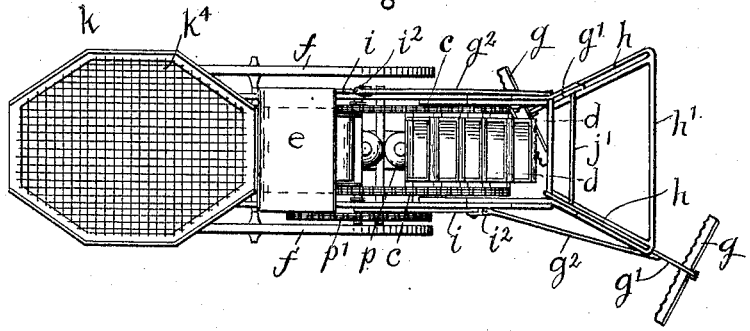

Figure 1 is a side view of the conveyer as in use. Fig. 2 is a plan view of the same, with the casing partly broken away. Fig. 3 is a side view of the invention with the conveyer proper thrown back in position for transportation. Fig. 4 is a detail side view of the upper portion of the conveyer showing the vibratory table in normal position. Fig. 5 is a detail front view of the same. Fig. 6 is a detail side view with parts broken away showing the vibratory table in the position assumed when a chain bucket is about to pass the same. Fig. 7 is a detail plan view of the same. Fig. 8 is a detail rear view of one of the shovel heads and its handle bar connection, also showing the operating rod connection, parts being broken away. Fig. 9 is a side view of the same. Fig. 10 is a front view of the same.

My invention relates to improvements in conveyers for moving grain, coal, gravel and the like, having for its object the provision of an efficient machine, economical in its operation, which may be readily applied to the loading and unloading of cars, wagons, ships, bins, elevators, etc., and which may be conveniently transported from place to place.

Other objects and advantages will hereinafter appear.

The invention consists in the novel construction and combinations of parts as hereinafter set forth.

In the accompanying drawings, illustrating the invention, the letter $a$, designates the conveyer, of which $b$, $b'$, are the sprocket carrying wheels, $c$, the endless sprocket chain engaging said wheels and having buckets, $d$, $d$, and $e$, the incasement or casing, the whole of which is a complete operative unit, being mounted upon wheels $f$, $f$, at one end.

The conveyer chain and casing are when in use in approximately vertical position, as shown in Fig. 1 of the drawings, and at the side thereof opposite to the wheels $f$, $f$, are provided reciprocatory shovels $g$, $g$, which are designed to gather the material to be loaded toward the conveyer buckets. The upright carrying bars or handles $g'$, $g'$, of these shovels work in slots $h$, $h$, of a frame $h'$, attached to the casing, said slots having a converging relation to the casing and conveyer buckets whereby the shovels in their movement will work the grain or coal toward the same from both sides. The reciprocatory movement of the shovels is effected by means of crank arms $i$, $i'$, of the shaft $b^2$, of the lower carrying wheels $b$, each crank arm having universal joint connection at $i^2$, with an inward extending arm $g^2$, of each shovel bar $g'$, such bars having each a slot $j$, at its upper end portion, a rod $j'$, engaging such slots and serving to allow upward and downward movement of the shovel in its reciprocation. Each arm $g^2$, of the shovel has an upward extending chain connection $g^3$, with frame bar $j^2$, in which the rod $j'$, is mounted, such chain serving to control the upward and downward movement of the shovel, which works in an arcuate path upon such chain as a radius, moving downward as it approaches the conveyer and upward in the reverse half of its stroke. The length of this chain is so adjusted that when the shovel is being thrust outward it is raised from the coal or other material, and when it is drawn inward it is dropped toward the floor of the bin or other receptacle. By this means the coal or other material is effectively drawn or shoveled toward the buckets of the conveyer.

The material being conveyed is when loaded into the buckets $d$, $d$, carried upward thereby and discharged into the chute $k$, having a rigid apertured top-frame connected or hinged to the upper end of the casing at $k'$, and from which depending canvas walls $k^2$, forming the body of the chute, are hung. A brace arm $k^3$, serves to keep the chute in proper position away from the conveyer casing. A screen $k^4$, may be provided in the aperture of the top frame of the chute.

For the purpose of preventing the material being transferred from falling down within the casing as the buckets are discharged into the chute, a vibratory inclined table or platform $l$, is provided, bridging the interval between the conveyer buckets and the chute and pivoted at its upper end to crank arms $m$, $m$, loosely mounted upon the axle $b^3$, of the upper sprocket carrying wheels $b'$, the lower end of said platform resting upon lugs $e^2$, of the casing. These crank arms are held in upright position by means of coil springs $l'$, connected thereto at their inner ends, surrounding the axle $b^3$, and fixed at the outer ends thereof to the side wall of the casing at $e'$. In the rotation of the upper wheels $b$, lateral projections $b^x$, thereof engage with the crank arms $m$, $m$, and move the same together with the vibratory platform downward and outward toward the screen $k$ as each bucket, which has previously discharged its load, approaches, so that it may pass, the coiled springs $l'$, $l'$, being at the same time wound or put under tension to a degree sufficient to cause them to contract laterally along the shaft $b^3$, the crank arms moving therewith until they spring past the lateral projections and with the platform resume normal position bridging the interval between the buckets and chute. The operation of the platform is repeated as each bucket discharges its load and approaches the platform.

The wheels $f$, $f$, are located at one end of the casing, the axle $f'$, thereof having journal bearings in a frame $f^2$, secured to the casing and composed of steel bars extending outward from the casing at substantially right angles beyond the peripheries of said wheels, where said bars are provided with a small wheel $f^3$, central of the wheels $f$, $f$. The frame $f^2$ has lateral brace bars $f^4$, connecting the same with the casing. In the vertical position of the casing and conveyer the lower end of the casing rests upon the ground at one side of the wheels $f$, $f$, and is stably supported. When the conveyer is to be moved or transported to another location, the attendant presses his foot upon extension $n$, of the frame bars $f^2$, tipping backward the casing and conveyer until the small third wheel $f^3$, rests upon the ground, as shown in Fig. 3 of the drawings. The end portion of the frame $f^2$, in which the small wheel $f^3$, is mounted is preferably pivoted at $n'$, to the body of such frame, whereby the wheel may be turned upward out of the way for nearer approach to the car or wagon to be loaded.

$p$, is a motor mounted within the casing and having sprocket gear connection $p'$, with the shaft of the upper wheels $b'$.

The shovel heads $g$, $g$, have hinge lugs $g^2$, $g^3$, whereby they are pivotally connected to the handle bars $g'$, $g'$, at $g^4$, the pivotal movement of each head being limited in one direction by engagement of upward extensions $g^5$, $g^5$, of the hinge lugs with lateral pins $g^6$, of the handle bar, and in the opposite direction by engagement of an upward extending lug $g^7$, (at the side of the head opposite the hinge lugs) with the handle bar. The pivotal movement thus allowed the shovel head upon its handle bar is of advantage in the shoveling action.

Having thus described my invention, what I claim as new and desire to secure by Letters Patent is:

1. In a conveyer for the purpose described, an endless carrier, a discharge chute separated from said carrier by an interval, an inclined vibratory table spanning said interval in its vibrations, and means for vibrating said table.

2. In a conveyer for the purpose described, an endless carrier, a discharge chute separated from said carrier by an interval, an inclined vibratory table spanning said interval in its vibrations, said table having a support at one end thereof upon which it slides, and a vibratory arm support at its opposite end portion, and means for vibrating said arm support.

3. In a conveyer for the purpose described, an endless carrier chain having buckets and carrying wheels, a discharge chute separated from said carrier by an interval, an inclined vibratory table spanning said interval in its vibrations, crank arms upon the upper carrying wheel shaft having a pivotal connection with said table at one end portion thereof, said table having a support at its opposite end portion upon which it slides.

4. In a conveyer for the purpose described, a casing, a motor, an endless conveyer chain, wheels for said chain, reciprocatory shovels having handle bars provided at their upper end portions with slot and pin connection with the casing, said shovels having operating crank and rod connection with said motor and limiting chain connection with the casing to cause them to move in an arcuate path.

5. In a conveyer for the purpose described, an endless conveyer chain, wheels for said chain, reciprocatory shovels having handle bars each provided at its upper end with slot and pin connection with the casing, said shovels having each an inward extending rod having a universal joint connection with a crank arm of a shaft operated by said motor, and a chain connecting said rod with the casing to cause the shovel to move in an arcuate path.

6. In a conveyer for the purpose described, an endless conveyer chain having buckets attached thereto at intervals, wheels for said chain, an inclined vibratory table upon which said buckets discharge, and means for operating said table including crank arms having at their upper ends pivotal connection with said table and loosely mounted upon a shaft, coil springs upon said shaft having at one end connection with the crank arms and at the other end connection with the casing, wheels upon the shaft of said crank arms having lugs engaging said crank arms to move the same with the table at intervals, said crank arms being capable of springing past said lugs to restore the table to normal position.

7. In a conveyer for the purpose described, an endless conveyer chain, wheels for the same, a casing therefor, supporting wheels having an axle connection with said casing at one end portion thereof, said casing being when upright capable of resting at one end thereof upon the ground, said axle having a roller-carrying extension capable of assuming an approximately horizontal position with the roller raised from the ground when the conveyer is upright.

8. In a conveyer for the purpose described, an endless conveyer chain, wheels for the same, a casing therefor, supporting wheels having an axle connection with said casing at one end thereof, said casing being when upright capable of resting at one end thereof upon the ground, said axle having a roller-carrying extension capable of assuming an approximately horizontal position with the roller raised from the ground when the conveyer is upright, the end portion of said extension in which the roller is journaled being pivoted and capable of being turned upward out of the way.

9. In a conveyer for the purpose described, an endless conveyer chain having bucket attachments, wheels for the same, a casing therefor, reciprocatory shovels for gathering the material to be transferred toward the conveyer, an inclined vibratory table upon which the buckets of the chain discharge, supporting wheels having an axle connected with said casing at one end thereof, said casing being when upright capable of resting at one end thereof upon the ground, said axle having a roller carrying extension capable of assuming a substantially horizontal position with the roller raised from the ground when the conveyer is upright.

10. In a conveyer for the purpose described, an endless conveyer chain having bucket attachments, wheels for the same, a casing therefor, a motor within said casing and having driving connection with said chain, supporting wheels having an axle connected with said casing at one end thereof, said casing being when upright capable of resting upon the ground, a chute having a rigid aperture top-frame connected to the casing and provided with depending walls, and a vibratory table bridging the interval between the buckets of the chain and the chute.

In testimony whereof I affix my signature, in presence of two witnesses.

ABNER WALLACE CRAWFORD.

Witnesses:
  A. W. CRAWFORD,
  KATE MURPHY.

---

Copies of this patent may be obtained for five cents each, by addressing the "Commissioner of Patents, Washington, D. C."